May 19, 1959  G. M. STOUT ET AL  2,887,592
CONTROL CIRCUIT FOR FLASHER LIGHTS AND THE LIKE
Filed May 14, 1957

INVENTORS
GLENN M. STOUT
ELMER J. PETERSON
BY Williamson, Schroeder,
Adams + Meyers
ATTORNEYS United States Patent Office 2,887,592
Patented May 19, 1959

2,887,592

CONTROL CIRCUIT FOR FLASHER LIGHTS AND THE LIKE

Glenn M. Stout and Elmer J. Peterson, Minneapolis, Minn., assignors to American Electronics Co., Minneapolis, Minn., a corporation of Minnesota Application May 14, 1957, Serial No. 659,121

19 Claims. (Cl. 307—132)

This invention relates to control circuits for periodically operating a device, and more specifically relates to a high efficiency control circuit for supplying timed pulses of energy to such a device.

Circuits and other apparatus used in the past to periodically energize devices, such as flasher lights employing gas filled bulbs, electric fences and the like, have had certain distinct disadvantages. One of the most important of such disadvantages has been that such circuits have been extremely inefficient. It has been experienced that batteries supplying energy to such devices have had to be replaced frequently.

Routine maintenance checks are generally made of the flasher lights of the type used in highway barricades and the like, at regular intervals and in many cases such routine maintenance checks are done at approximately one month intervals. However, many of the flasher lights now known require that the batteries thereof be replaced more frequently than once a month and of course substantial expense is involved in replacing these batteries, particularly when the cost of the labor involved is considered. It is highly desirable that the circuits for such flasher units be such that the batteries will last the full length of interval between maintenance checks and of course it is desirable that the flasher lights produce substantially uniform light throughout the length of battery life.

With these comments in mind it is to the elimination of these and other disadvantages in known control circuits to which the present invention is directed, along with the inclusion therein of other novel and desirable features.

An object of our invention is to provide a new and improved circuit of simple and inexpensive construction and operation for periodically operating a device.

Another object of our invention is to provide a novel control circuit which supplies timed pulses of energy for periodically operating a device and which operates at extremely high efficiency to minimize power usage by effectively reusing current after the same has been used in timing, for energizing such a device.

Still another object of our invention is to provide an improved control circuit for supplying timed pulses of energy for operating a device, and which circuit will operate effectively within a wide range of voltages of the power source applied thereto.

A further object of our invention is to provide a control circuit for periodically operating a device and which circuit may be readily and easily varied to adjust the time duration during which the device is energized and de-energized.

A still further object of our invention is the provision of an improved control circuit for supplying timed pulses of energy for operating devices such as neon bulbs, and wherein each of the pulses of energy operates the device a plurality of times to lengthen the duration of operation of the device and thoroughly utilize the power in the pulses.

These and other objects and advantages of our invention will more fully appear from the following description made in connection with the accompanying drawings wherein like reference characters refer to the same parts throughout the several views and in which.

Figure 3:
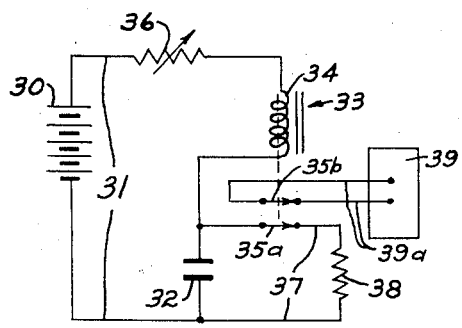
Figure 4:
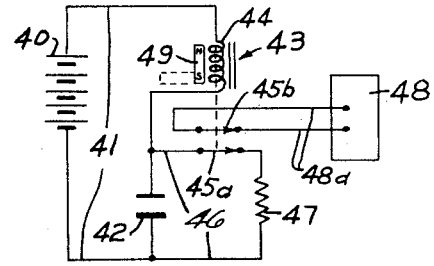
Figure 5:
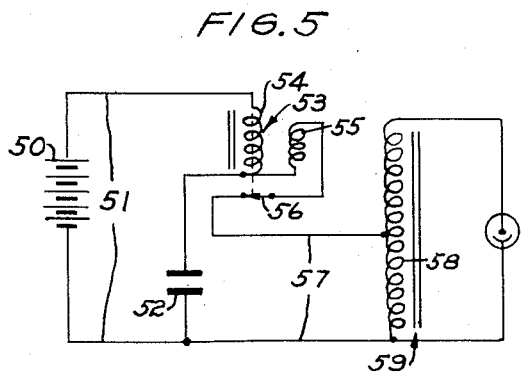
Figure 6:
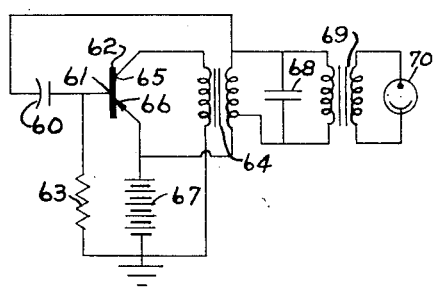

Fig. 3 is a schematic view of still another form of the control circuit which is shown at a particular instant in the operating cycle at which time the relay has dropped out and allowed the contacts to close to permit discharging of the condenser and firing of the controlled device and at which time the current in the relay has not yet reached such a magnitude as to cause the relay to operate for opening the contacts;

Fig. 4 is a schematic view of still another form of the control circuit which is shown at a particular instant in the operating cycle at which time the relay has dropped out and allowed the contacts to close to permit discharging of the condenser and firing of the controlled device and at which time the current in the relay has not yet reached such a magnitude as to cause the relay to operate for opening the contacts;

Fig. 5 is a schematic view of still another form of the control circuit which is shown at a particular instant in the operating cycle at which time the relay has dropped out and allowed the contact to close to permit discharging of the condenser and firing of the bulb and at which time the current in the relay has not yet reached such a magnitude as to cause the relay to operate for opening the contact; and Fig. 6 is a schematic view of still another form of the control circuit.

The control circuits shown each includes a source of electric power and an energy-storing device which in the form shown comprises a condenser. A charging circuit connects the condenser to the source of power. Means are provided for controlling charging and discharging of the condenser and producing responses in accordance with the predetermined charges on the condenser, and such means are coupled with the device to be operated. Such control means include a condenser discharge circuit having a power dissipating load therein and also having a discharge current flow control reacting to said responses for periodically permitting and restricting discharge of the condenser through the discharge circuit. Such means also include a detector connected with the condenser and operating in relation to predetermined charges in the condenser.

Figure 1:
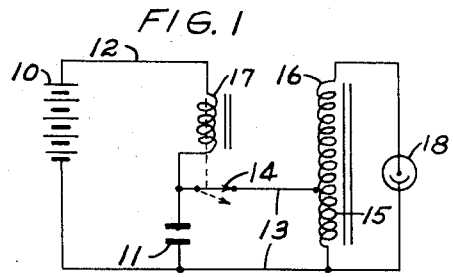
Fig. 1 is a schematic view of one form of the control circuit which is shown at a particular instant in the operating cycle at which time the relay has dropped out and allowed the contact to close to permit discharging of the condenser and firing of the bulb and at which time the current in the relay has not yet reached such a magnitude as to cause the relay to operate for opening the contact.

The control circuit shown in Fig. 1 includes a source of electric power, exemplified by battery 10, and a condenser 11. A charging circuit 12 connects the battery 10 to the condenser 11. A discharge circuit 13 is connected across the condenser 11 and includes a discharge current flow control embodied by relay contacts 14, and the input windings 15 of transformer 16. The relay coil 17 is connected in the charging circuit 12 and provides an impedance to charging current and also functions as a detector producing responses in relation to the charges on condenser 11. The coil 17 of the relay operates relay contacts 14 in a conventional manner and the contacts 14 are arranged to be closed when the current in coil 17 decreases to a predetermined value so as to release the contacts thereof. Contacts 14 will open when the current in coil 17 increases to a predetermined value, which is substantially higher than that at which the relay releases. The construction of the relay 17 must be such that the relay will pull in at substantially the same current value each time current is applied thereto, and such that the relay releases at substantially the same current value each time the condenser is being charged.

Transformer 16 is of a conventional type having a ferrous metal core and the output of the transformer is connected to the device to be operated, which device in the form shown, comprises a neon bulb 18. Of course the transformer input windings include a resistive component and the transformer and bulb 18 may be considered to be a resistive load in the discharge circuit. Of course when a changing current is supplied to the input of transformer 16 the voltage will be changed and in the form shown, stepped up to operate the bulb 18.

In one form of the control circuit shown in Fig. 1, the condenser 11 has a value of ten mfd., the transformer 16 has a step-up ratio of 10/250 and the voltage of the battery or power source is sixty to one hundred fifty volts. In applications of the control circuit with flasher lights of the type to be used on highway road blocks and the like, the electrolyte of condenser 11 must be such that the operating characteristics of the condenser will remain substantially constant throughout a wide range of temperatures, such as at least to twenty degrees below zero.

In the operation of the circuit, the condenser 11 is periodically charged to thereby store a quantity of energy therein. Each time the condenser is charged, the discharge circuit 13 is closed and the condenser discharges through the input windings of the transformer 16 to thereby cause a pulse of energy to be supplied to the bulb 18 which is coupled to the transformer. In the form shown, energy is supplied to the bulb 18 approximately once each second and therefore it will be seen that the condenser charges and discharges approximately once every second. When the charge in the condenser approaches full charge, the current in the charging circuit decreases to a point at which the relay releases contacts 14, allowing the same to close. When contacts 14 close, condenser 11 is quickly discharged by current flowing through the discharge circuit and through the transformer input. Of course as the condenser 11 discharges, the current in the charging circuit 12 increases immediately and very sharply. While contacts 14 are closed the current in the discharge circuit 13 oscillates and an oscillating voltage is applied on the neon bulb 18. It has been found that due to this oscillation, the bulb 18 will actually be illuminated approximately two times due to two voltage pips, however, it appears to the human eye that bulb 18 is illuminated only once. The charge on the condenser decreases in a substantially straight line function between condenser voltage and time; and the charging current in the charging circuit 12 similarly increased rapidly in substantially a straight line function between charging current and time. When the charging current increases to a predetermined value, the relay pulls in and opens contacts 14 to terminate discharging of the condenser through the discharge circuit 13. After the contacts 14 open, current in the charging circuit continues to increase, but at a somewhat slower rate, and the charging current subsequently peaks and then begins to decrease in a familiar substantially hyperbolic relationship between charging current and time. The relay remains energized as the current decreases below the pull in current value and the contacts 14 remain open until current in the charging circuit decreases to the predetermined current at which the relay releases, at which time the condenser 11 has a substantial charge thereon. While the relay contacts 14 are open, that is, while the charging current peaks and then subsequently diminishes, the charge on the condenser increases in a familiar, substantially hyperbolic curve between condenser voltage and time due to the impedance in the charging circuit provided by the relay coil 17. Of course it should be understood that additional impedance might be placed in the charging circuit, such as a variable resistor, to adjust the rate of charging and the charging time of the condenser 11. Such additional impedance in the charging circuit is specifically shown in other forms of the invention disclosed herein.

It has been found that a flasher light employing the neon bulb and the control circuit shown in Fig. 1 has sufficient brilliance to adequately function for highway road blocks and the like, and has sufficient light when a conventional dry cell battery is employed so that the battery need be replaced only at infrequent intervals and will last at least between monthly routine maintenance checks. It has been experienced that it is substantially cheaper with the present control circuit to permit the flasher light to run continuously, day and night, than to turn off the flasher light when the same is not in active use. The high efficiency of the persent control circuit is at least in part attributed to the fact that current flowing through the relay coil 17 for controlling the timing of the circuit and for operating the relay actually builds up the charge on the condenser and then substantially all of this charge built on the condenser by the timing current is discharged into the transformer input for providing energy to periodically light the neon bulb 18. The oscillation of the discharging current between the condenser and transformer input lengthens the perceptible flash of the bulb.

Figure 2:
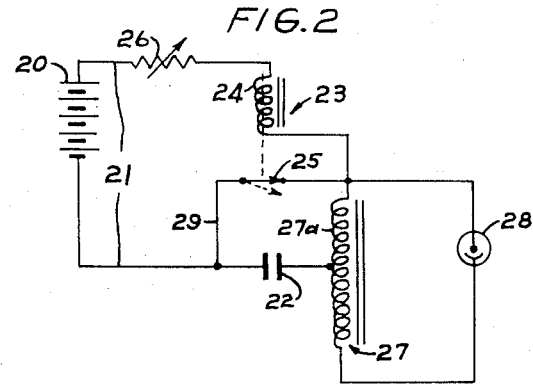
Fig. 2 is a schematic view of a modified form of the control circuit.

The circuit shown in Fig. 2 is similar in many respects to that shown in Fig. 1 and the control circuit includes a source of electric power or battery 20, a charging circuit 21 connected to the battery for supplying charge or energy to the condenser 22. A relay 23 has a coil 24 in the charging circuit and also has normally closed contacts 25 (closed when the relay coil is de-energized). A variable impedance to charging current, embodied by variable resistor 26 is also provided in the charging circuit 21 to supplement the impedance to charging current provided by the relay coil 24. A transformer 27 of conventional type having a ferrous metal core has an input winding 27a which is connected in the charging circuit immediately adjacent the condenser 22 and in series relation therewith. The output of the transformer 27 is coupled with the neon bulb 28. A low impedance discharge circuit 29 includes the contacts 25 of relay 23 and is connected in shunting relation around the series connected transformer input 27a and condenser 22.

The operation of this form of the invention shown in Fig. 2 is similar to that of the circuit shown in Fig. 1, and as the charging current flows through the charging circuit 21 to condenser 22 the relay is energized and the contacts 25 thereof are open. The charging time, which may be substantially longer than the discharge time, may be adjusted by adjusting the variable resistor 26. As the charge in the condenser approaches full charge, the charging current in circuit 21 diminishes as previously described in connection with Fig. 1 and when the charging current has diminished sufficiently, the relay 23 releases causing the contacts 25 thereof to close. It will be noted that while the condenser 22 is charging, current flows through the input windings 27a of the transformer 27 in one direction. As a result, the transformer has a residual magnetism with a certain predetermined initial pole orientation. When the contacts 25 close, current is circulated in an opposite direction through the transformer input winding 27a, resulting in a very high instantaneous impedance while the contacts are closing. Due to the fact that the contacts 25 close against a high impedance, arcing at the contacts is closely controlled and kept at a minimum. The control circuit shown causes the transformer to be energized or fired from essentially the same point on the hysteresis loop each time. This reversed current through the transformer input 27a is due to the discharging of condenser 22 through the transformer input 27 and discharge circuit 29.

When condenser 22 discharges into the transformer input, an oscillation will be set up causing a plurality of pulses of energy to be applied to the neon bulb 28. It has been experienced in this control circuit, that the bulb 28 will flash approximately seven times due to the discharging of condenser 22. The seven flashes of the bulb 28 are not individually perceptible to the human eye because of their rapidity, but on the other hand they appear as a single flash having substantial brilliancy which may be seen at a very substantialy distance.

When the contacts 25 close, the current through the relay coil 24 rapidly increases, and this current will also flow through the discharge circuit 29 and the resistor 26. There is a small delay, due to the inductive impedance of relay coil 24 between the closing of contacts 25 and the operation of the relay which again reopens the contacts 25, and this time delay is sufficient to permit the condenser 22 to discharge and cause the neon bulb 28 to flash. When the contacts 25 reopen, the current flowing through the relay coil 24 is diverted from the discharge circuit 29 and into and through the transformer input 27a and condenser 22. The current in the transformer input thereupon reverses its direction again and charging of the condenser 22 starts. As hereinbefore described in connection with Fig. 1, the charging current will continue to increase beyond the point at which relay 23 pulls in, and the current will peak and then diminish in a familiar hyperbolic relation between charging current and time. The rate of flow of charging current and therefore charging time may be adjusted by varying resistor 26. It should also be noted that varying of resistor 26 has also the effect of controlling the current through relay coil 24 during the time that the contacts 25 thereof are closed and therefore has the effect of controlling the time during which the relay contacts 25 are closed. It may thus be assured that the contacts 25 will be closed sufficiently long to permit substantially complete discharging of condenser 22.

In the form of the invention shown in Fig. 3, a source of electric power or battery 30 is connected through the charging circuit 31 to a condenser 32. A relay 33 has a coil 34 in the charging circuit and has contacts 35a and 35b. A variable resistor 36 is also provided in the charging circuit. A discharge circuit 37 is connected across the condenser 32 and a power dissipating resistive load 38 and contacts 35a therein. The contacts 35 are normally closed when the relay is deenergized and will open upon energization of the relay. The device 39 to be operated is connected by suitable conductors 39a to the contacts 35b of relay 33 and the coupling of the control circuit is thereby accomplished through the mechanical connection between the contacts 35a and 35b and the mechanical relation between the contacts and the relay coil 34.

The operation of the circuit shown in Fig. 3 is substantially similar to that described in connection with Fig. 1. In this control circuit, the condenser 32 discharges into the resistor 38. It has been found that with the present circuit wherein the condenser 32 has a value of approximately ten mfd., and the resistor 38 is approximately five thousand ohms, and where the applied voltage is approximately sixty to one hundred fifty volts D.C., the control circuit will have an operation cycle of approximately four seconds and the time durations during which the contacts 35b are respectively opened and closed for operating device 39, are approximately equal. In the case if resistor 36 has substantial resistance, the charging time of condenser 32 is substantially increased, and therefore the period during which device 39 is operated will be varied. By replacing resistor 38 with one of small value, the discharging time of the condenser may be substantially reduced to further vary the operating characteristics of the control circuit.

In the form of the invention shown in Fig. 4 the control circuit is similar to that shown in Figs. 1 and 3, and includes a source of electric power 40, a charging circuit 41 connected to the battery 40 and also connected to a condenser 42. A relay 43 has a coil 44 connected in series relation with the charging circuit and with condenser 42, and contacts 45a and 45b. A discharge circuit 46 is connected across the condenser 42 and includes contacts 45a and a power dissipating resistive load 47. An operable device 48 is connected by means of conductors 48a to the contacts 45b to be operated thereby. A permanent magnet 49 is positioned immediately adjacent the relay coil 44 and is movable with respect thereto so as to orient the poles of the permanent magnet in alignment with the coil 44 or transversely thereof. By rotating the magnet 49 from one position to another, the frequency of cycle operation may be substantially varied. The magnet 49 will have most effect upon the relays 43 during the charging of condenser 42. The permanent magnet 49 will have a substantial effect in varying the point at which relays 43 release the contacts 45a and 45b thereof. When the contacts 45a are released, the contacts will close and when the relay pulls in, contacts 45a will open.

The control circuit shown in Fig. 5 includes a source of electric energy or battery 50 which is connected by means of a charging circuit 51 to a condenser 52. A relay 53 is provided with a conventional relay coil 54 and an auxiliary coil 55 which may comprise a portion of the relay coil, and contacts 56. The relay coil 54 is connected in the charging circuit 51. A discharge circuit 57 is connected across the condenser 52 and includes the auxiliary coil 55 and contacts 56, and also includes the input winding 58 of transformer 59. The output of transformer 59 is coupled to a neon bulb 60.

Contacts 56 of relay 53 are normally closed when the relay coil is de-energized and are open when the coil is energized. The auxiliary coil 55 is magnetically coupled with the relay coil 54 so that current flowing therein has an effect upon the operation of the contacts 56. The auxiliary coil 55 is arranged, in relation to the current flowing therethrough and in relation to the relay coil 54 so as to oppose the effect of coil 54 upon the operation of contacts 56.

The operation of the control circuit shown in Fig. 5 is substantially identical to that shown in Fig. 1 with the exception that as the current in the charging circuit decreases to the point at which the relay 53 releases, the auxiliary coil 55 is energized as the contacts 56 are closing, and because the ampere turns of coils 54 and 55 are in opposition to each other, the controlling effect of relay coil 54 upon the contacts 56 is substantially reduced and the contacts 56 close with an improved snap action and spurious oscillations in the control circuit are effectively damped by operation of auxiliary coil 55. Fluttering of the circuit is very substantially reduced and substantially eliminated. High frequency operation of the control circuit is substantially eliminated and the circuit will operate at the desired frequency of approximately one cycle of operation per second.

It will be recognized that damping of the relay operation may also be effected by physically attaching a weight to the contacts of the relay and thereby restricting operation of the contacts except when sustained charging current is passed through the relay coil.

The form of the circuit shown in Fig. 6 is similar to the other circuits but employs as a portion thereof, a transistor circuit to perform the necessary switching operations. The charging capacitor 60 is connected at one side thereof to the base electrode 61 of a transistor 62 and is also connected to a resistor 63 to ground. A stepdown voltage transformer 64 having a primary to secondary ratio of approximately thirty to one is connected at one end of its primary winding to the emitter electrode 65 of the transistor 62 and is connected at the other end of the primary winding to ground. One end of the secondary winding of the transformer 64 is connected to the capacitor 60, and the other end of the secondary winding is connected to the collector electrode 66. The collector electrode 66 is also connected to the positive side of battery 67, the negative side of which is connected to ground. One side of the secondary of transformer 64 is also connected to one side of a capacitor 68, the other side of which is connected to a center tap in the secondary transformer 64. The primary winding of a step-up transformer 69, having a primary to secondary ratio of approximately one to thirty, is connected across the capacitor 68 in shunting relation. The secondary of transformer 69 is connected to the bulb 70.

In the operation of the circuit shown in Fig. 6, the cycle is started by battery 67 which passes current through the emitter electrode circuit and through the primary winding of transformer 64. As secondary voltage in the transformer appears, the rate of charging of capacitor 60 is increased until the capacitor 60 is fully charged, at which time a reverse base voltage appears to stop all action in the circuit. At this time the charge on capacitor 60 can only bleed off through resistance 63. As the charge on capacitor 60 bleeds through the resistance 63, the base voltage of the transistor is gradually brought back to the point where the cycle can repeat itself. During the charging cycle, the capacitor 68 and transformer 69 tends to oscillate and feeds a small signal back to the base. In the operation of this circuit, it has been experienced that the bulb 70 will be flashed approximately seven times during one cycle of the circuit operation thereby causing the light 70 to appear to the human eye to have a sustained period of energization. The lights 70 will then be cut off for a period of time and then re-energized as the cycle of the circuit repeats itself.

It will be seen that we have provided a new and improved and highly efficient control circuit for timing and periodically operating a device which is coupled to the control circuit and which is operated in accordance with charging and discharging of a condenser.

It will also be apparent that we have provided a novel control circuit which makes the fullest utilization of current supplied thereto from a source by utilizing the current initially for timing the periodic operation and building a charge on a condenser, and subsequently directing the energy stored in the condenser to such a periodically operable device for operating the same.

It will, of course, be understood that various changes may be made in the form, detail, arrangement and proportion of the parts without departing from the scope of our invention which consists of the matter described herein and set forth in the appended claims.

What we claim is:

1. A control circuit for periodically operating a device, comprising a source of electric power, a condenser, a charging circuit connecting said condenser with said source, discharge circuit means connected across said condenser and being coupled with said device for operating the same, said discharge circuit means including a resistive load and also including current flow control means to control discharging of the condenser, and condenser charge detecting means connected with the condenser and also connected in controlling relation with said flow control means to operate the same and permit discharging of the condenser when the same contains a substantial charge and including an impedance to charging current in said charging circuit, whereby the condenser is periodically discharged to operate said mechanism.

2. In an electric circuit, a source of electric power, a condenser, a charging circuit connecting said source with said condenser, discharge circuit means connected across said condenser including a power-consuming load and also including current flow control means to control discharging of the condenser, and operating means connected in charge-detecting relation with said condenser to be operated in response to the charge thereon, said operating means including an impedance in the charging circuit and said operating means being connected in controlling relation with flow control means to operate the same and permit discharging of the condenser when the condenser has a substantial charge.

3. A control circuit for periodically operating a device, comprising a source of electric power, an energy-storing media, an energy supplying circuit connecting said source with said media, means controlling energizing and de-energizing of the media and including a restriction to current flow in the supplying circuit, said means producing responses reflecting different predetermined quantities of energy stored in said media and said means being coupled with said device for operating the same in accordance with said responses, and said means including an energy dissipating discharge circuit connected across the media, said discharge circuit having a current flow control reacting to said responses for periodically permitting and restricting current flow and energy dissipation in the discharge circuit, whereby to periodically operate the device.

4. A control circuit for periodically operating a device, comprising a source of electric power, a condenser, a charging circuit connecting said condenser with the source, condenser charge control means connected with the condenser and including an impedance to charging current in the charging circuit, said control means producing responses in relation to different predetermined charges on the condenser and being coupled with said device for operating the same in accordance with said responses, said means including a discharge circuit connected across the condenser and having a resistance therein, said discharge circuit also having a discharge current flow control reacting to said responses for periodically permitting and restricting discharge of the condenser, whereby to periodically operate the device.

5. A control circuit for periodically operating a device, comprising a source of electric power, a condenser, a charging circuit connecting said source with said condenser, means controlling charging and discharging of the condenser and including an impedance to charging current in the charging circuit, said means producing responses to different charges on the condenser and being coupled with said device for operating the same in accordance with said responses, and said means including a discharge circuit connected across the condenser and having a resistance therein, said discharge circuit also having a discharge current flow control reacting to said responses for periodically permitting and restricting discharge of the condenser in relation to the charge in the condenser, whereby to periodically operate the device.

6. A control circuit for periodically operating a device, comprising a source of electric power, a condenser, a charging circuit connecting said source with said condenser, means controlling charging and discharging of the condenser and including an impedance to charging current in the charging circuit, said means producing responses to different charging currents to the condenser and being coupled with the device for operating the same in accordance with said responses, and said means including a discharge circuit connected across the condenser and having a resistive load therein, said discharge circuit also having a discharge current flow control reacting to said responses for periodically permitting and restricting discharge of the condenser in relation to the charging current to the condenser, whereby to periodically operate the device.

7. A control circuit for periodically operating a device, comprising a source of electric power, a condenser, a charging circuit connecting said source with said condenser, means controlling charging and discharging of the condenser and including a response-producing current flow impedance in the charging circuit and reacting to different predetermined condenser-charging currents, said means being coupled with the device for operating the same in time relation to the responses produced by said impedance, and said means including a discharge circuit connected across the condenser and having a resistive load therein, said discharge circuit also having a discharge current flow control connected with said impedance and reacting to the responses thereof for periodically permitting and restricting discharge of the condenser in relation to the charging current in the charging circuit whereby to periodically operate the device.

8. A control circuit for periodically operating a device, comprising a source of electric power, a condenser, a charging circuit connecting said source with said condenser, means controlling charging and discharging of the condenser and including a coil connected in series relation with the condenser, including an impedance to charging current in the charging circuit, said coil having a ferrous metal core, said means producing responses to different charges on the condenser and being coupled with said device for operating the same in accordance with said responses, and said means also including a low impedance discharge circuit in shunting relation with the series-connected condenser and coil, and said discharge circuit having a discharge current flow control reacting to said responses and periodically permitting and restricting, in relation to the charge on the condenser, discharge of the condenser through the coil impedance and the discharge circuit and whereby current flow in the coil is reversed in charging and discharging of the condenser.

9. A control circuit for periodically operating a device, comprising a source of electric power, a condenser, a charging circuit connecting said source with said condenser, means reacting to charging and discharging of the condenser and including a response-producing inductive impedance in the charging circuit for reacting to different predetermined condenser-charging currents, said means being coupled with the device for operating the same in time relation to the responses produced by said impedance, said means also including a discharge circuit connected across the condenser and having an energy dissipating load therein, said discharge circuit also having switch means connected with said inductive impedance and reacting to the responses produced thereby for periodically opening and closing the discharge circuit and discharging the condenser in time relation to the different predetermined charging currents in the charging circuit.

10. A control circuit for periodically operating a device, comprising a source of electric power, a condenser, a charging circuit connecting said source with said condenser, means reacting to current in the charging circuit and including a relay having contacts and also having a coil in the charging circuit for reacting to different predetermined condenser-charging currents for operating said contacts, said means being coupled with the device for operating the same in time relation to the operation of the relay, said means including a discharge circuit connected across the condenser and having a resistive load therein, said discharge circuit also having said relay contacts therein for periodically permitting discharge of the condenser through the discharge circuit, said relay being arranged to close the contacts in response to low charging current and to open said contacts in response to high charging current, whereby to periodically operate the device.

11. A control circuit for periodically operating a device, comprising a source of electric power, a condenser, a charging circuit connecting said source with said condenser, means controlling charging and discharging of the condenser and including an impedance to charging current in the charging circuit, said means producing responses to different charges on the condenser, and said means including a discharge circuit connected across the condenser and having a resistance therein, said discharge circuit also having switch means reacting to said responses for periodically permitting and restricting discharge of the condenser, and movable contacts connected with said switch means to be operated thereby and connected in controlling relation with the device for periodically operating the same.

12. A control circuit for periodically operating a device, a condenser, a charging circuit connecting said source with said condenser, means controlling charging and discharging of the condenser and including an impedance to charging current in the charging circuit, said means producing responses to different charges on the condenser, and said means including a discharge circuit connected across the condenser and having a discharge current flow control reacting to said responses for periodically permitting and restricting discharge of the condenser through the discharge circuit, and a transformer having an input in the discharge circuit and having an output connected with such a device for operating the same.

13. A control circuit for periodically operating a device, comprising a source of electric power, a condenser, a transformer having a ferrous metal core and having an input connected in series relation with the condenser, the output of the transformer being coupled with such a device for operating the same, a charging circuit connecting said source with the condenser and transformer input, a condenser discharging circuit including switching means and also including the transformer input, said discharging circuit being arranged to produce current flow in the transformer input, during discharging of the condenser in a reverse direction relative to charging current through the transformer input, and means connected with the condenser for detecting charge therein and also connected with said switching means for operating the same in relation to predetermined charges in the condenser.

14. A control circuit for periodically operating a device, comprising a source of electric power, a condenser, a charging circuit connecting said source with said condenser, a relay having a coil in the charging circuit and also having contacts, said contacts closing in response to low charging current and opening in response to high charging current, a transformer having an input and an output, a discharge circuit connected across the condenser and including said contacts and the transformer input, the output of the transformer being coupled with such a device for periodically operating the same in accordance with the charging and discharging of the condenser.

15. A control circuit for periodically operating a device, comprising a source of electric power, a condenser, a relay having a coil and having contacts, a charging circuit including said coil and connecting the condenser with said source, said contacts opening in response to high charging current and closing in response to low charging current through the coil, a transformer having an input connected in the charging circuit adjacent the condenser, said transformer also having an output adapted to be coupled to such a device for operating the same, a low impedance discharge circuit including said contacts and being connected in shunt relation with the transformer input and condenser whereby the contacts close against the instantaneous high impedance of the transformer input and the current in the transformer input is completely reversed for transmitting energy at substantially maximum efficiency to the transformer output for operating the device.

16. A control circuit for periodically operating a device, comprising a source of electric power, a condenser, a charging circuit connecting said source with said condenser, means controlling charging and discharging of the condenser and including a variable impedance to charging current in the charging circuit, said means producing responses to different charges on the condenser and being coupled with said device for operating the same in accordance with said responses, and said means including a discharge circuit connected across the condenser and having a resistance therein, said discharge circuit also having a discharge current flow control reacting to said responses for periodically permitting and restricting discharge of the condenser, whereby varying of said impedance changes the condenser charging time to thereby change the operative periods of the device.

17. The invention as set forth in claim 9 and including a permanent magnet magnetically coupled in the magnetic circuit of said response-producing inductive impedance, said magnet being movable relative to said impedance for changing the magnetic coupling therewith and thereby changing the reaction of said impedance to condenser-charging currents, whereby to change the currents to which said impedance responds and thereby adjusting the operation periods of the device.

18. The invention as set forth in claim 10 and including means for damping operation of the relay, whereby to prevent fluttering thereof and the production of spurious oscillations in the circuit.

19. The invention as set forth in claim 10 wherein said relay also includes an auxiliary coil magnetically coupled with the relay coil and connected in the discharge circuit to be energized by discharging of the condenser, said auxiliary coil being arranged, in relation to the current passing therethrough and in relation to the relay coil, that the ampere turns thereof oppose the ampere turns of the relay coil to thereby reduce the effect of the relay coil on the contacts as the same are closing and thereby permit the contacts to close with an improved snap action, and to also provide a damping action on spurious oscillations in the control circuit.

References Cited in the file of this patent

UNITED STATES PATENTS 2,415,944     Fagen _____ Feb. 18, 1947